March 15, 1960   E. LOOSE ET AL   2,928,326
FOCAL-PLANE SHUTTERS FOR PHOTOGRAPHIC CAMERAS
Filed Aug. 13, 1954   2 Sheets-Sheet 1
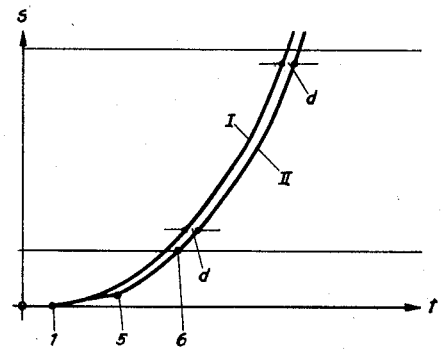
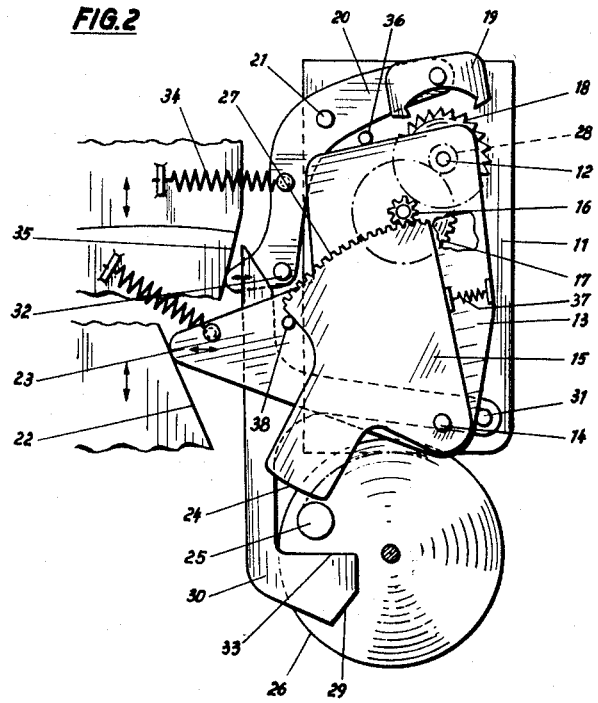
INVENTORS:
Erhard LOOSE and
Heinz BACHMANN
BY
Attorney

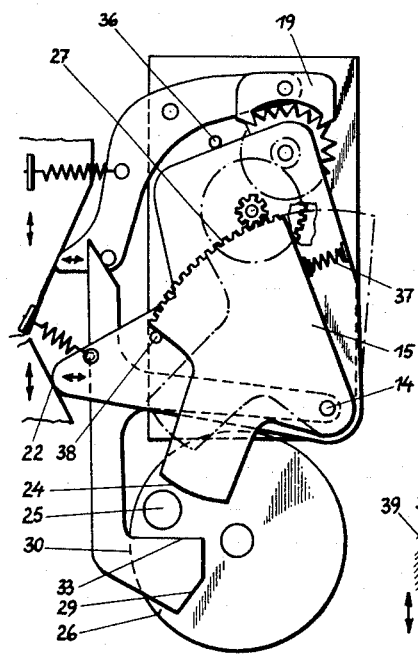
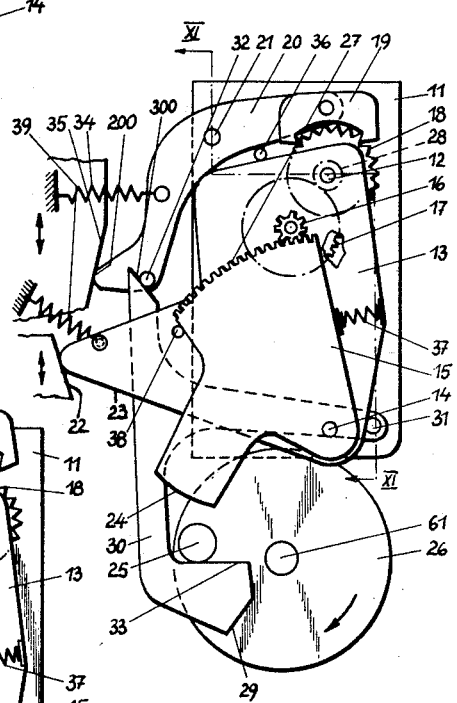
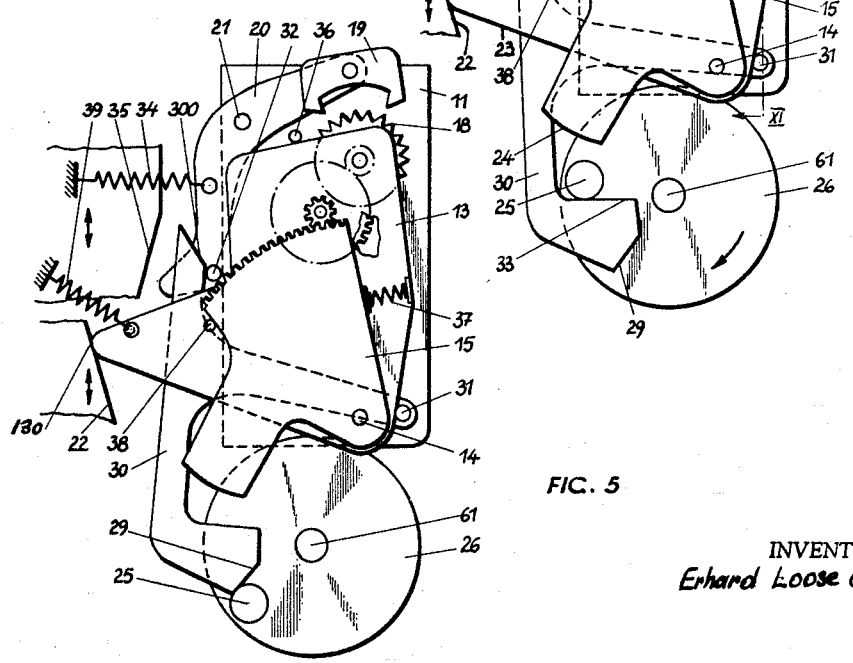

United States Patent Office 2,928,326
Patented Mar. 15, 1960

2,928,326

FOCAL-PLANE SHUTTERS FOR PHOTOGRAPHIC CAMERAS

Erhard Loose and Heinz Bachmann, Dresden, Germany, assignors to VEB Kamera- und Kinowerke Dresden Application August 13, 1954, Serial No. 449,729

Claims priority, application Germany September 26, 1953

1 Claim. (Cl. 95—57)

This invention relates to a focal plane shutter for photographic cameras, which is provided with two spring-actuated curtains simultaneously moving independently of each other across the stage on release and the curtain closing the stage being retarded to obtain different lengths of exposure.

In the known shutters of this type both curtains responding to the pull of their springs run off simultaneously when released. The passage of the first curtain across the stage is uninterrupted, but that of the second one closing the stage is retarded prior to closing the stage by an arresting device comprising a gear engageable by an anchor. This gear is connected to the curtain drive by a toothed segment adjusted so as to bring parts thereof differing in length into engagement with the gear, whereby the motion of the curtain is retarded and exposures ranging for instance from $\frac{1}{1000}$ sec. to one second can be obtained.

This arrangement is, however, open to a serious objection. On entering the stage the retarded second curtain has not yet acquired the same speed as the first one, and this has the effect that, due to the different speed characteristics of the two curtains, each point of the image field, particularly in shortest exposures, is not given an equal length of exposure.

It has been tried to overcome the disadvantage of these different speed characteristics in various ways to insure after retardation approximately equal speed of both curtains on their arrival at the edge of the stage, but in modern miniature cameras, owing to the restricted space, this is not always possible. It has further been proposed to attain practically equal speed characteristics of both curtains by altering the moments of inertia of the curtain rollers and also the driving springs of the retarded second curtain relative to those of the first. In this way approximately equal speed characteristics of both curtains are obtainable, but only in so far as the lengths of exposure on arrival of the curtains at and their withdrawal from the stage will correspond to the time set while exposure in the center of the stage will not correspond thereto. This result is unsatisfactory and fails to meet the requirements a focal plane shutter is expected to fulfill.

According to the invention, equal lengths of exposure for each point of the image field, particularly for shortest exposure, are provided by arranging the retarding device in such manner that the closing or second curtain, immediately after starting, is retarded for all exposures, so that in case of short exposures, after brief retardation, a relatively long way up to the edge of the stage is available.

By way of example, the invention is illustrated in the accompanying drawings, wherein Figure 1 diagrammatically shows the path of the two curtains;

Fig. 2 shows an arresting device, including an anchor, adjusted for short engagement or exposure;

Fig. 3 shows the same device adjusted for an exposure requiring a longer engagement thereof with the anchor engaged also;

Fig. 4 is a view of the arresting device showing the relationship of the elements when the curtains are in a covering objective opening position; and Fig. 5 is a view similar to Fig. 4 but showing the position of the curtains when the elements are released and the objective opening is exposed.

Referring now to the drawings, the present invention is used in a camera including a housing in which there are disposed the more or less conventional photographic elements including the focal plane shutter comprising two curtains I and II disposed over the objective opening. The curtains I and II are operatively associated with the film transporting knob. The curtains I and II themselves are mounted on two torsion spring mounted rollers which serve to draw the curtains I and II across the objective opening and thereby temporarily expose the film. This is accomplished by releasing a conventional locking mechanism. Since this invention relates to the curtain shutter mechanism and more particularly to the means for coordinating the exposure time of the curtains and not to the locking mechanism which is of more or less well known structure, the locking mechanism and rollers are not shown on the drawings.

As is well known in the art, the focal plane curtains are locked over the objective opening and the release of the locking means is accomplished in a known manner upon the turning angle of the film transporting knob which serves to actuate the objective opening locking means and the film transport mechanism. The curtains are unlocked prior to the time the film has been completely wound. In this manner, it is possible to have a time delay between the disconnection of the curtain locking mechanism and the film transporting mechanism. Regarding the curtain lock releasing mechanism, it does not form a part of the present invention and, therefore, is not shown on the drawings.

Arranged in the upper portion of the camera housing (not shown) is a timing arrangement including the timing cams 22 and 35 partially illustrated in Figs. 3, 4 and 5. A timing knob (not shown) is fastened on a shaft (not shown) journaled on the casing of the camera. The shaft is operatively connected to the timing cams 22 and 35 which are in respective operating engagement with cam followers 200 and 130 respectively carried on levers 20 and 23. This timing arrangement which is operatively connected to curtains I and II is the actual subject matter of the present invention. What is considered new is the timing arrangement per se, and the combination in a camera of the timing arrangement and two simultaneously releasable curtains. The functioning of the arrangement is carried out by a retarding device which is adapted to permit the curtain II to acquire the same speed and move over the image field at the same rate as curtain I.

In the diagram shown in Fig. 1 the curtains I and II start their motion at 1. Curtain I moves unchecked over the stage S. Curtain II immediately after starting is braked by the arresting device and leaves it at 5 so as to have sufficient time, prior to reaching the edge 6 of the stage, to acquire the speed of curtain I and thus move over the image field at practically the same speed as curtain I. The length of exposure $d$ is therefore equal at different parts of the image field. With increasing lengths of exposure requiring longer retardation the speed of the curtain II on entering the stage will be slightly slower than that of curtain I, but in view of the lengths of exposure this has no detrimental effect.

The arresting device is disposed on a plate 11 firmly connected with the camera body (not shown). On the plate 11 a second plate 13 movable about the shaft 12 is provided and supports the toothed segment 15 arranged around the shaft 14 and, by way of the pinion 16 on the movable plate 13 and the gear wheel 17, drives the gear 18 engageable by the anchor 19 and positioned on the shaft 12. The gear 18 can transmit its motion to the anchor 19 when the latter is in engagement therewith as shown in Fig. 3. For disengagement the anchor 19 is placed on a lever 20 disposed on the plate 11 and rotatable about the shaft 21. The arresting device is set for different exposures by a cam 22 movable by a knob (not shown), in the direction of the arrow, whereby the nose 23 of the movable plate 13 is engaged and the plate swung about the shaft 12 and the toothed segment 15 on the plate 13 comes with its flank 24 formed as circular arc with the center 12 within the turning range of the pin 25 firmly positioned on the wheel 26 connected to the curtain II. For holding the nose 23 of the plate 13 in engagement with the cam surface 22 is a spring 39 which extends between the plate 13 and housing 40. Holding the toothed segment 15 in a normally static position relatively to the plate 13 so that the radius of flank 24 lies on its center 12 there is provided a spring 37 which extends between left edges of plate 13 and toothed segment 15 and resiliently maintains the right edge against a stop pin 38. The same knob 50 also moves the cam 22 and moves also the cam 35 which controls the lever 20 to bring the anchor 19 out of engagement with the gear 18. In this way long exposures by retardation via the wheel chain 16, 17, 28 and anchor 19 and short exposures by way of the chain alone are obtained.

Due to the arrangement of the entire arresting device with the exception of gear 18 and anchor 19 on a plate slewable about the shaft of gear 18, the toothed segment 15 more or less movable by the exposure setting means into the path of the pin 25 firmly connected with curtain II is guided so as to maintain the same distance from the pin at any exposure, so that at the starting of curtain II the braking action for all exposures always begins at the same point.

The curtains I and II are wound and ready to be released for exposure of the film in the known manner as previously described whereupon the depression of a releasing plunger (not shown), the curtain I is released in the usual manner. Fig. 4 illustrates the position of the retarding mechanism operative on the curtain prior to the depression thereof. It is to be observed that the flank 24 lies in the path of movement of the pin 25 carried on the wheel 26 such that when the wheel is released and rotates clockwise as the curtain II secured thereto is wound on its shaft (not shown) the pin 25 strikes the flank 24 of the toothed segment 15 and moves the latter clockwise about its pivot 14 against the action of the spring 37. Hence the teeth 27 meshing with the gear train 16, 17 and 28 actuates the gear 18. Obviously, the gear train arrangement shown in Fig. 2 is effective to retard the movement of the segment 15 and the curtain II will not be released until the flank 24 is clear of the pin 25. Whereupon the wheel 26 is free to rotate and the curtain II rotates at the same speed as the curtain I. Similarly, as shown in Figs. 4 and 5, when the camming surface 35 arranged such as to position the anchor 19 carried on the lever 20 into engagement with the gear 18 a further retarding action is achieved.

After the curtain II has been wound on the shaft, not shown, the pin 25 strikes the edge 29 of the lever 30 and moves it clockwise about its pivot such that an inclined camming surface 30 formed on the upper end and in engagement with a pin 32 mounted on the end lever 20 is effective to elevate the anchor 19 against the action of the spring 34 and out of engagement with gear 18. Hence, upon winding the curtain II to its locked position over the objective opening the disc 26 turns counter-clockwise until the pin 25 abuts the upper edge 33 on the lever 30 and thereby is effective to tilt the lever 30 and position the camming surface 300 adjacent the pin 32 such that the spring may turn the lever 20 to position the anchor 19 on engagement with the gear 18 shown in Fig. 4. Obviously, since the anchor 19 is not in engagement with the gear during winding, this operation is achieved without noise.

In Fig. 3 there is shown the relative positions of the elements of the arresting device for increasing the period of retardation of the curtain II for a different exposure time. As shown the cam surface 22 and 35 are located such that a flank 24 is moved further to the left than shown in Figs. 4 and 5. Hence, since the segment 15 must move through a longer path than shown in Figs. 4 and 5, it is obvious that the period of retardation will be extended.

We claim:

In a photographic camera having a shutter mechanism including two movable curtains for exposing the film in said camera to light by simultaneously moving across the objective opening of said camera, a timing mechanism controlling the movement of one of said curtains, comprising in combination, a stationary supporting plate connected to the body of said camera, a first shaft connected to said supporting plate, a movable plate having a first nose member journaled on said first shaft, a toothed plate having a projecting member journaled on a second shaft, spring means connecting said toothed plate and said movable plate, said second shaft being mounted on said movable plate substantially parallel to said first shaft, a first pinion journaled on said movable plate, said first pinion being in meshed engagement with said toothed plate, a first gear wheel journaled on said movable plate coaxially with said first pinion, a second pinion journaled on said first shaft, a second gear wheel journaled coaxially with said second pinion on said first shaft, a first lever having a projection and a second nose member pivotally mounted on said support plate and having an end adjacent to said second gear wheel, an anchor member rockably secured to said first lever at said end adjacent to said second gear wheel, said anchor member meshing with said second gear wheel when said first lever is pivoted towards said second gear wheel so that the rotary movement of said second gear wheel is slowed down when said anchor member and gear wheel mesh, a rotatable wheel operatively connected to said one of said curtains of said shutter mechanism, a pin connected to said wheel, abutting during part of the rotary movement of said wheel against the projecting member of said toothed plate, a first movable cam member abutting against said second nose member for adjusting the position of said first lever and thereby controlling the time interval during which said anchor member remains in meshed engagement with said second gear wheel during the controlled movement of one of said curtains, a second movable cam abutting against said first nose member for adjusting the position of said movable plate and thereby regulating the time interval during which said toothed plate is in meshed engagement with said pinion and consequently regulating the rotary speed of said wheel and the controlled movement of one of said curtains.

References Cited in the file of this patent
UNITED STATES PATENTS

| 2,122,671 | Leitz et al. | July 5, 1938 |
| 2,365,690 | Fassin | Dec. 26, 1944 |
| 2,548,530 | Harvey | Apr. 10, 1951 |
| 2,758,526 | McFadden | Aug. 14, 1956 |
| 2,877,698 | Beach | Mar. 17, 1959 |

FOREIGN PATENTS

| 852,806 | Germany | Oct. 20, 1952 |